USO10227017B2

(12) United States Patent
Bae et al.

(10) Patent No.: US 10,227,017 B2
(45) Date of Patent: Mar. 12, 2019

(54) CAMERA-BASED VEHICLE POSITION DETERMINATION WITH KNOWN TARGET

(71) Applicant: Faraday & Future Inc., Gardena, CA (US)

(72) Inventors: Hong S. Bae, Torrance, CA (US); Paul Alan Theodosis, Rancho Palos Verdes, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 0 days.

(21) Appl. No.: 15/365,410

(22) Filed: Nov. 30, 2016

(65) Prior Publication Data

US 2017/0151883 A1 Jun. 1, 2017

Related U.S. Application Data

(60) Provisional application No. 62/261,249, filed on Nov. 30, 2015.

(51) Int. Cl.
*B60L 11/18* (2006.01)
*G05D 1/02* (2006.01)

(52) U.S. Cl.
CPC ........ *B60L 11/1835* (2013.01); *G05D 1/0246* (2013.01); *G06T 2207/30204* (2013.01); *G06T 2207/30252* (2013.01)

(58) Field of Classification Search
None
See application file for complete search history.

(56) References Cited

U.S. PATENT DOCUMENTS

| 9,311,706 | B2 * | 4/2016 | Natroshvili | G06T 5/006 |
| 9,557,741 | B1 | 1/2017 | Elie et al. | |
| 9,575,321 | B2 * | 2/2017 | Osterhout | G06T 19/20 |
| 9,676,389 | B2 * | 6/2017 | Clarke | B60W 30/00 |
| 9,896,091 | B1 | 2/2018 | Kurt et al. | |
| 10,025,317 | B2 | 7/2018 | Batur et al. | |
| 2004/0054473 | A1 * | 3/2004 | Shimomura | G01S 3/7865 |
| | | | | 701/301 |
| 2004/0267420 | A1 | 12/2004 | Tanaka et al. | |
| 2007/0282504 | A1 | 12/2007 | Luke et al. | |
| 2009/0259365 | A1 | 10/2009 | Rohlfs et al. | |
| 2010/0060486 | A1 | 3/2010 | Nakashima et al. | |
| 2010/0070138 | A1 | 3/2010 | Schoening et al. | |
| 2010/0231416 | A1 | 9/2010 | Wu et al. | |

(Continued)

FOREIGN PATENT DOCUMENTS

CN 101216937 A 7/2008

OTHER PUBLICATIONS

Notice of Allowance dated Mar. 15, 2018, for U.S. Appl. No. 15/620,665, filed Jun. 12, 2017, seven pages.

*Primary Examiner* — Reza Aghevli
(74) *Attorney, Agent, or Firm* — Morrison & Foerster LLP

(57) ABSTRACT

A vehicle control system capable of moving a vehicle to a target location is disclosed. According to a preferred embodiment, a camera captures one or more images of a known object corresponding to the target location. An on-board computer having stored thereon information about the known object can process the one or more images to determine vehicle location with respect to the known object. The system can use the vehicle's determined location and a feedback controller to move the vehicle to the target location.

20 Claims, 13 Drawing Sheets

(56) References Cited

U.S. PATENT DOCUMENTS

| | | |
|---|---|---|
| 2013/0010119 A1 | 1/2013 | Mitsugi |
| 2013/0021171 A1 | 1/2013 | Hsu et al. |
| 2014/0192181 A1* | 7/2014 | Taylor ............... B60C 23/0408 |
| | | 348/118 |
| 2015/0057887 A1 | 2/2015 | Kim |
| 2015/0151725 A1* | 6/2015 | Clarke ................ B60W 30/00 |
| | | 701/28 |
| 2015/0210274 A1* | 7/2015 | Clarke ................ B60W 30/00 |
| | | 382/104 |
| 2015/0336547 A1* | 11/2015 | Dagan .................... B60T 7/22 |
| | | 701/70 |
| 2015/0355468 A1* | 12/2015 | Osterhout ............. G06F 3/012 |
| | | 345/633 |
| 2016/0049008 A1* | 2/2016 | Haddick ........... G02B 27/0172 |
| | | 345/633 |
| 2017/0297385 A1 | 10/2017 | Kim |
| 2017/0300062 A1 | 10/2017 | Kim |
| 2018/0029591 A1 | 2/2018 | Lavoie |

* cited by examiner

L = 4 Pixels

L = 7 Pixels

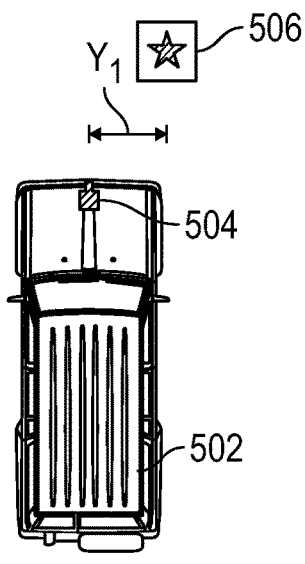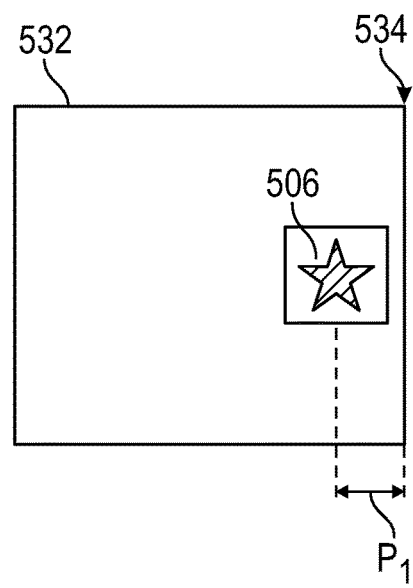
FIG. 5A  FIG. 5B
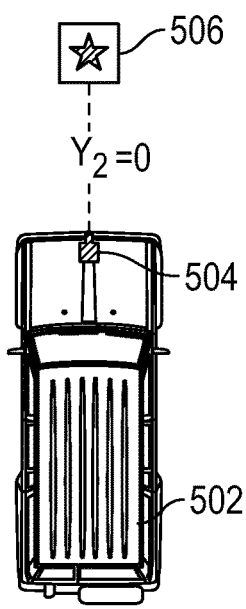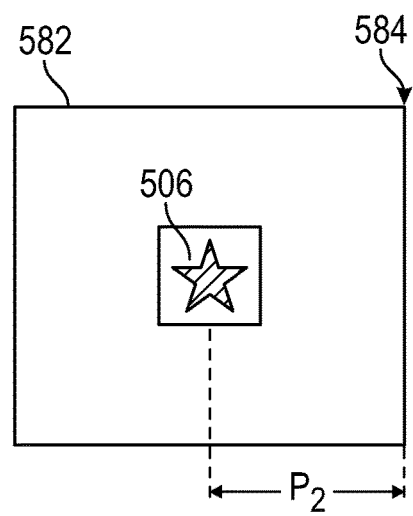
FIG. 5C  FIG. 5D

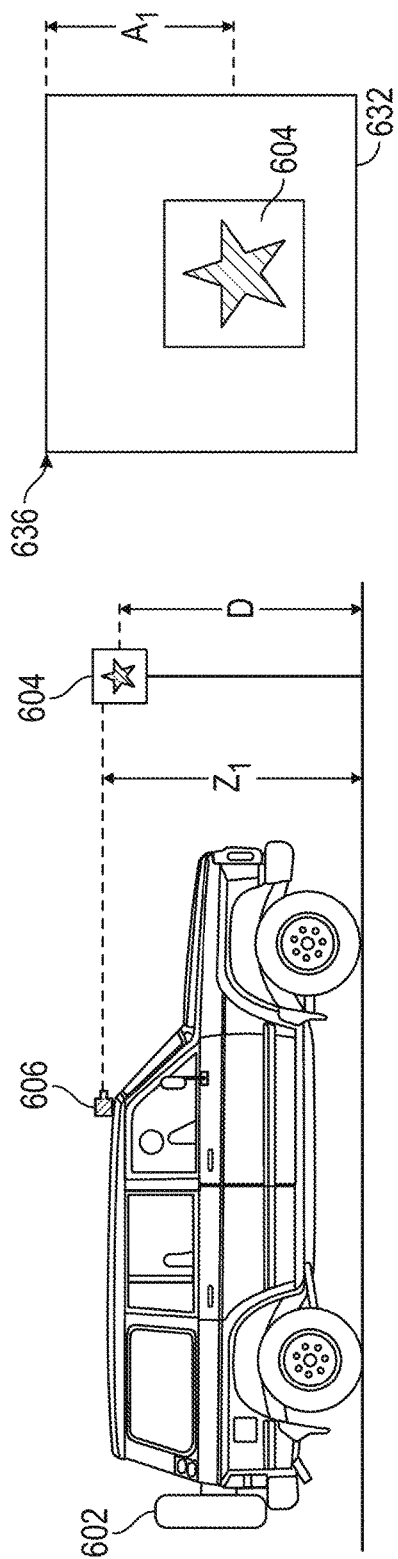
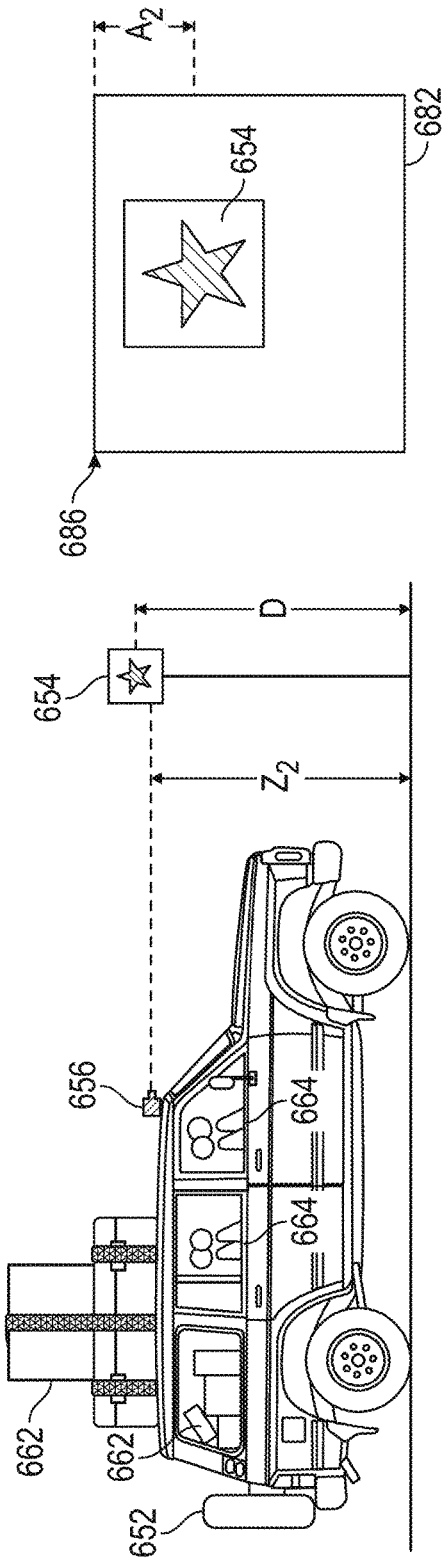

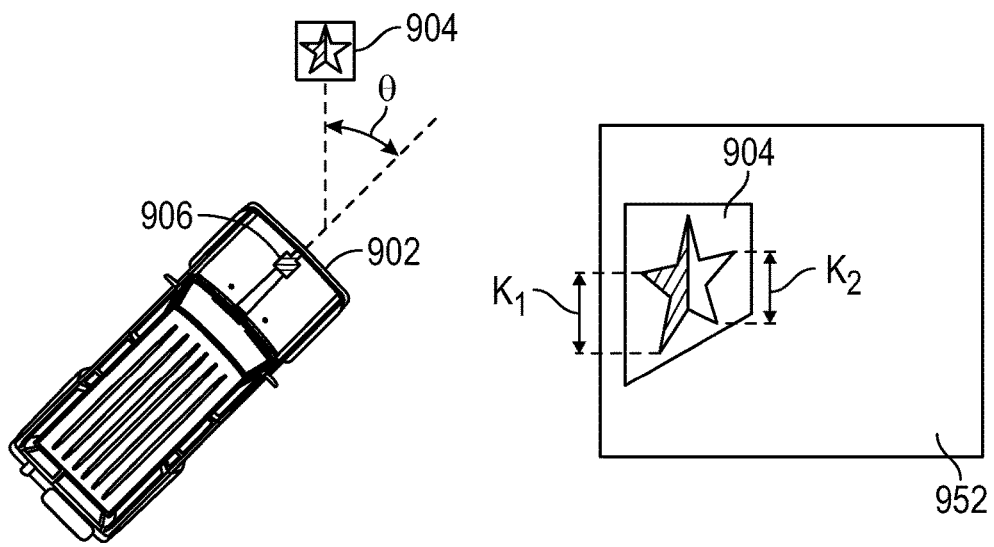
FIG. 9A
FIG. 9B
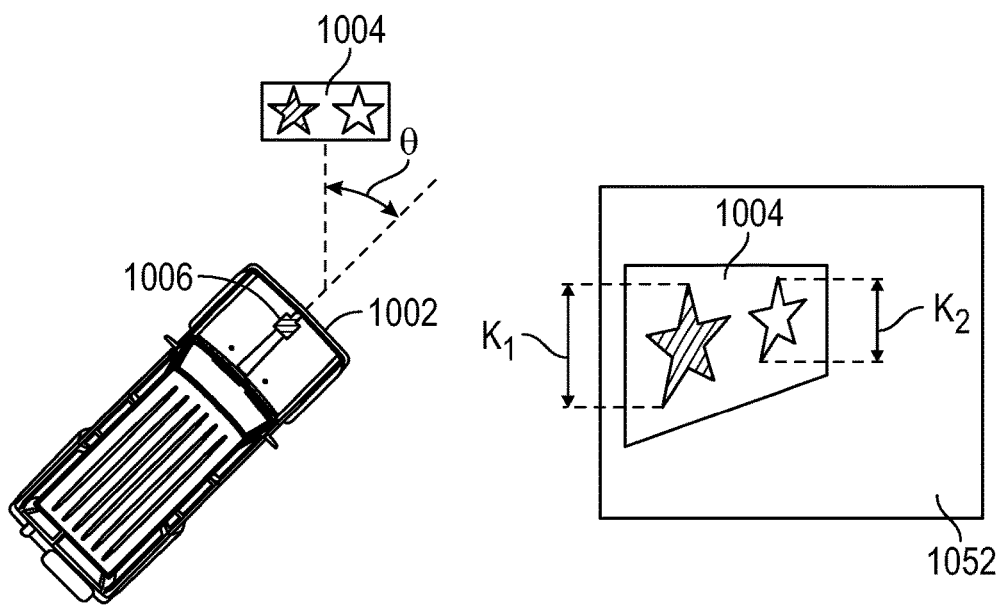
FIG. 10A
FIG. 10B

CAMERA-BASED VEHICLE POSITION DETERMINATION WITH KNOWN TARGET

CROSS REFERENCE TO RELATED APPLICATION

This application claims the benefit of U.S. Provisional Patent Application No. 62/261,249, filed on Nov. 30, 2015, the entire disclosure of which is incorporated herein by reference in its entirety for all intended purposes.

FIELD OF THE DISCLOSURE

The present invention relates to a vehicle, and more particularly, a vehicle capable of determining its location with respect to a marker having a known characteristic (e.g., shape, size, pattern, position, etc.).

BACKGROUND

On-board cameras have become increasingly common in consumer automobiles. Typically, these cameras are mounted to the back of a vehicle so the driver can conveniently monitor the space behind the vehicle when driving in reverse, though some vehicles may include forward-facing cameras as well. Because the sizes of the objects behind the vehicle can be unknown to the vehicle's on-board computer, these "backup cameras" can be incapable of determining the distance between the vehicle and objects proximate to the vehicle. In order to detect the distance between the vehicle and proximate objects, additional sensors can be used. Consumer automobiles can feature radar or ultrasonic sensors for distance sensing purposes. These sensors can determine the distance between the vehicle and a proximate object, but may have difficulty performing when the object is too close to the sensor. As a result, this technology can be impractical for close-range distance measurements.

These close-range distance measurements can be critical in automated vehicle technology. High accuracy positional measurements can be required to precisely maneuver an automated vehicle into a small space, or to park the vehicle, for example. As the vehicle moves within a small space, the ability to detect objects close to the vehicle can become more important. Because radar and ultrasonic sensors may not be able to measure short distances, these technologies may not be suitable when the vehicle is in a small space. Advanced sensor technology, such as LiDAR, may be able to perform at a range of distances with high accuracy, but are seldom incorporated into consumer automobiles, primarily due to cost. Therefore, there exists a need in the field of consumer automobiles to accurately measure the distance between proximate objects and a vehicle to facilitate automated vehicle control and/or movement, such as automated parking.

SUMMARY

The present invention relates to a vehicle control system capable of determining vehicle location (e.g., distance, orientation, etc.) with respect to a marker having a known characteristic (e.g., shape, size, pattern, position, etc.). According to some embodiments of the present invention, a vehicle control system includes one or more cameras, an on-board computer, and a vehicle controller. When a camera captures an image of an at least partially known marker, an on-board computer uses the image and known information about the marker as well as the camera's position on a vehicle to determine the vehicle's location with respect to the marker. With this information, the vehicle controller can, for example, automatically move the vehicle to a desired location with respect to the known marker. In some examples, the vehicle may be an electric automobile and the desired location may correspond to a battery recharging station. The recharging station may be located in a public place such as a parking lot or garage or in a vehicle owner's private garage, for example. In some examples, when the vehicle moves to a close proximity of the recharging station, charging can begin automatically so that a driver does not need to manually connect the charger and begin charging the vehicle.

BRIEF DESCRIPTION OF THE DRAWINGS

FIGS. 5A-5D illustrate a vehicle outfitted with a camera capturing an image of a known object, and determining the vehicle's lateral offset from the known object according to examples of the disclosed invention.

FIGS. 6A-6D illustrate a vehicle outfitted with a camera capturing an image of a known object, and determining the vehicle's height from the ground according to examples of the disclosed invention.

FIGS. 9A-9B illustrate a vehicle outfitted with a camera capturing an image of a known object having an asymmetrical pattern according to examples of the disclosed invention.

FIGS. 10A-10B illustrate a vehicle outfitted with a camera and an image of a known object having two markings according to examples of the disclosed invention.

DETAILED DESCRIPTION

In the following description, reference is made to the accompanying drawings which form a part hereof, and in which it is shown by way of illustration specific examples that can be practiced. It is to be understood that other examples can be used and structural changes can be made without departing from the scope of the examples of the disclosed invention.

The various embodiments of the present invention relate to a vehicle control system capable of determining vehicle location (e.g., distance, orientation, etc.) with respect to a marker having a known characteristic (e.g., shape, size, pattern, position, etc.). In accordance with a preferred embodiment of the present invention, the vehicle control system includes one or more cameras, an on-board computer, and a vehicle controller. When a camera captures an image of an at least partially known marker, an on-board computer can use the image and known information about the marker and the camera's position on a vehicle to determine the vehicle's location with respect to the marker. With this information, the vehicle controller can, for example, move the vehicle to a desired location with respect to the known marker automatically. In some examples, the vehicle may be an electric automobile and the desired location may correspond to a battery recharging station. The recharging station may be located in a public place such as a parking lot or garage or in a vehicle owner's private garage, for example. When the vehicle moves to a close proximity of the recharging station, charging can begin automatically so that a driver does not need to manually connect the charger and begin charging the vehicle.

Figure 1:
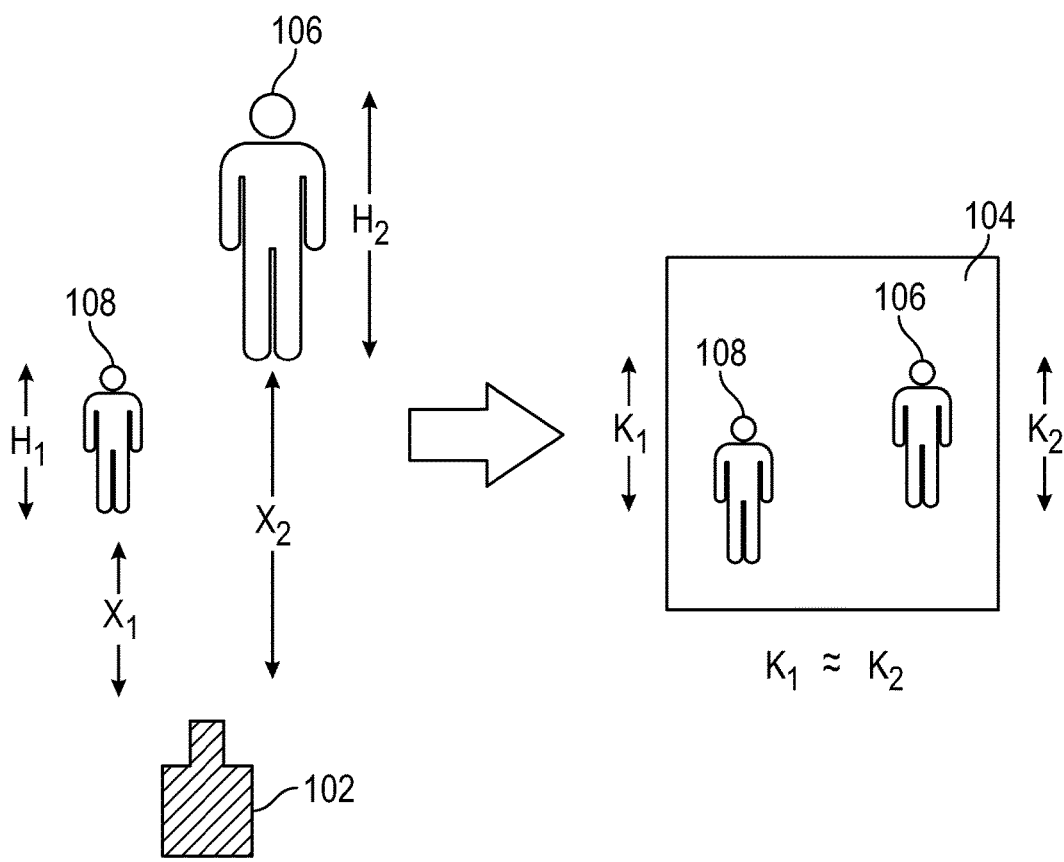
FIG. 1 illustrates an exemplary camera capturing an image of two example objects of unknown size and position relative to the camera according to examples of the disclosed invention.

FIG. 1 illustrates an exemplary camera 102 capturing an image of two example objects 106 and 108 of unknown size and position relative to the camera. Camera 102 can be an analog camera using film or a digital camera capturing images based on pixels or vectors, for example. Some examples can feature other types of cameras and image formats, such as infrared cameras. The camera 102 can capture an image 104 of two example objects 106 and 108. The first example object 106 can be larger and further away from the camera 102 than the second example object 108 (i.e., X1 can be less than X2, and H1 can be less than H2). In some examples, however, the size and position of the example objects 106 and 108 relative to the camera 102 can be unknown to the camera and/or the system of which the camera is a part.

In some examples, the camera 102 can be mounted on a vehicle. For the reasons provided above, it may be desirable to determine the sizes and/or positions of example objects 106 and 108 relative to the camera 102 using the image 104 to determine the vehicle's relative location with respect to objects 106 and 108. However, because the camera 102 and/or its associated system may not have information about the sizes and/or positions of example objects 106 and 108, the sizes and positions of the example objects 106 and 108 in the resulting image 104 may be unclear. Specifically, although the first example object 106 can be larger and further away from the camera 102 than the second example object 108, the first object 106 can appear to have height K2 in the image 104 and the second object can appear to have height K1 in the image 104—these heights can appear to be the substantially the same in the image 104, when, in fact, object 106 can have height H2 while object 108 can have height H1, less than H2, as previously described. In other words, in image 104, a larger object further away from the camera 102 can appear to have the same size as a smaller object closer to the camera. Therefore, without knowledge of the actual size of an object, it may not be possible to determine the distance of the object from the camera 102 by analyzing image 104.

Figure 2A:
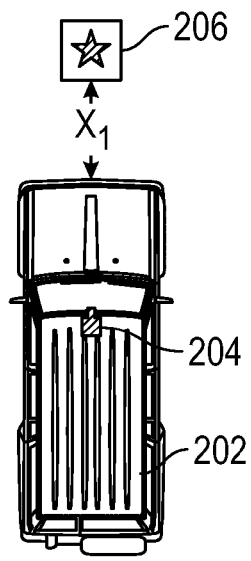
FIGS. 2A-2D illustrate a vehicle outfitted with a camera capturing images of a known object, and determining the vehicle's distance from the known object according to examples of the disclosed invention.

If, on the other hand, a camera captures an image of an object whose size is known to the camera and/or its associated system, the distance between the camera and the object can be determined. FIGS. 2A-2D illustrate a vehicle 202 outfitted with a camera 204 capturing images of a known object 206, and determining the vehicle's distance from the known object according to examples of the disclosed invention. More particularly, FIG. 2A illustrates a vehicle 202 outfitted with a camera 204. The vehicle 202 can be positioned distance X1 from an object 206, whose size can be known by the vehicle's on-board computer (not shown), for example. In some examples, the size of object 206 can be any characteristic of its size, such as its area, its perimeter dimension, its horizontal and/or vertical dimension at a given location, etc. In some examples, the relative position of the camera 204 on the vehicle 202 may also be known by the vehicle's on-board computer (not shown).

Figure 2B:
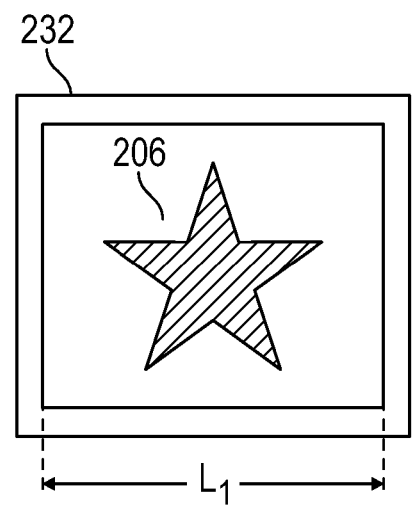
Figure 2C:
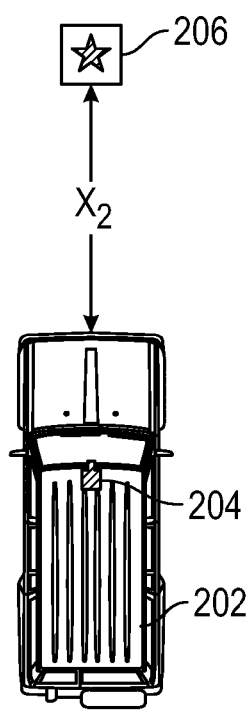
Figure 2D:
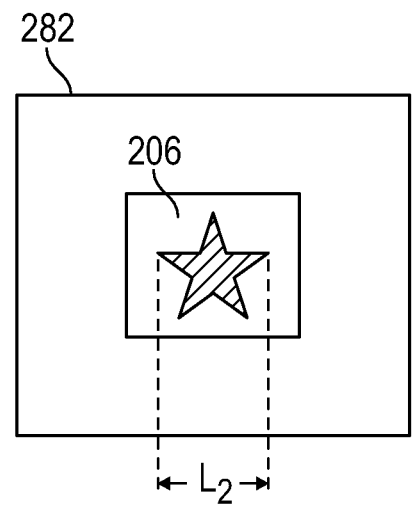

The camera 202 may capture the image 232 of known object 206 shown in FIG. 2B, where the known object 206 may appear to have a width of L1, for example. In FIG. 2C, the vehicle 202 may be positioned at a distance of X2, greater than X1, from the known object 206. On-board camera 204 may capture the image 282 shown in FIG. 2D, where the known object 206 may appear to have a width of L2, less than L1, for example. As stated above, the resulting images may show the known object to have correspondingly different widths. When the vehicle 202 is a shorter distance X1 from a known object 206, the apparent width L1 of the known object 206 in image 232 may be larger than the apparent width L2 of the object 206 in image 282, captured when vehicle 202 is a distance X2 from the object 206, for example. Hence, a vehicle's on-board computer may use the apparent size of an object in a captured image to determine the vehicle's distance from the known object when the size of the object is known, as will be described in more detail below. The vehicle can use this information to position itself at a desired distance from the known object (e.g., an image/marker on a charging station).

Figure 3A:
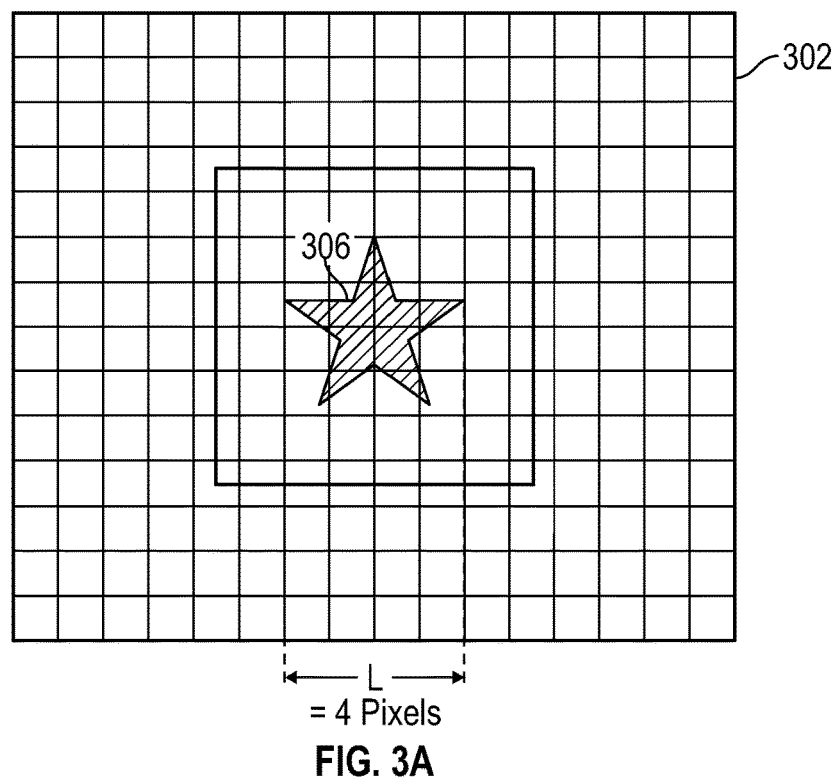
FIGS. 3A-3B illustrate images of known objects according to examples of the disclosed invention.
Figure 3B:
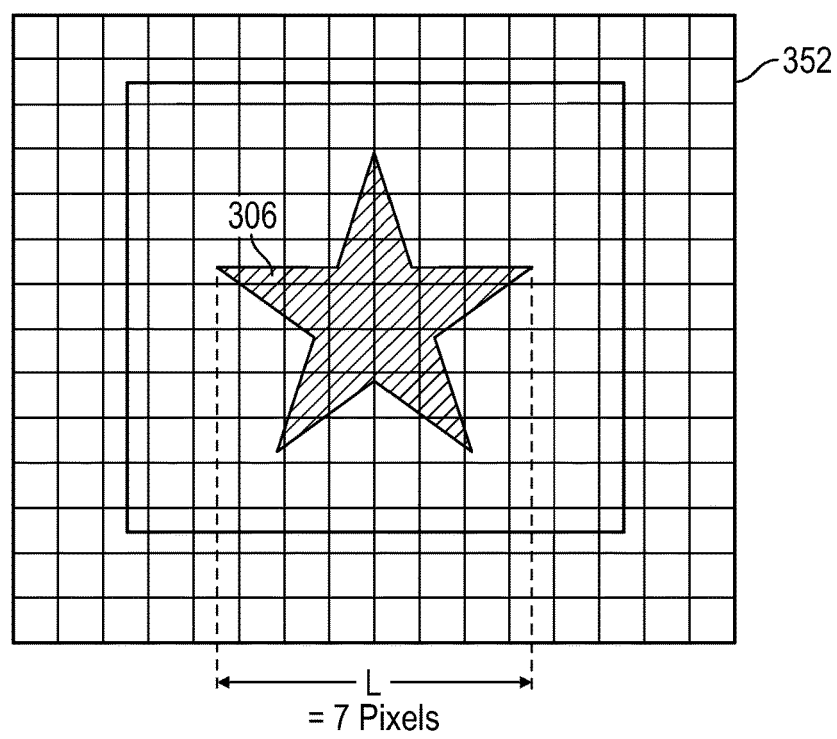

The apparent sizes of known objects in captured images can be determined using image processing. FIGS. 3A-3B illustrate images of known objects according to examples of the disclosed invention. The images may be captured digitally and stored in a pixelated format. In the examples of FIGS. 3A-3B, each example image can be 13 pixels wide and 12 pixels tall, although other image sizes, as well as images not stored in a pixelated format, are possible. Other examples may use any other image format including analog cameras using film or other digital formats including vector graphics, for example. Other example cameras and image formats may also be possible. In the examples of FIGS. 3A-3B, the size (e.g., width, in this circumstance) of known object 306 in images 302 and 352 can be the width of the object, in pixels. The example image 302 in FIG. 3A can depict the known object 306 (e.g., a star shape) with an apparent width L of 4 pixels, for example. The example image 352 in FIG. 3B can depict the known object 306 with an apparent width L of 7 pixels. Based on the difference apparent sizes of the known object 306 in images 302 and 352, an on-board computer on a vehicle can determine that the example image 302 in FIG. 3A may have been captured at a further distance from object 306 than the image 352 in FIG. 3B, for example.

Figure 4:
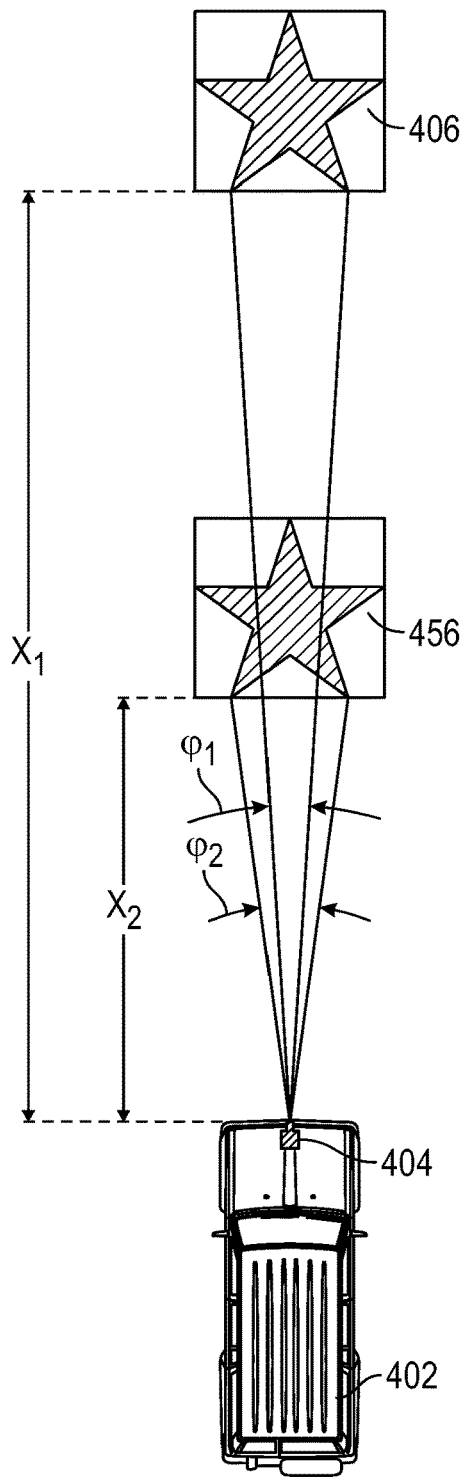
FIG. 4 illustrates a vehicle outfitted with a camera capturing images of two known objects, each object forming an angle relative to the camera according to examples of the disclosed invention.

As shown in FIGS. 2A-2D and 3A-3B, an object of one size may appear to be bigger or smaller in a captured image depending on the camera's distance from the object. This apparent difference in size can also be illustrated as a difference in viewing angle. FIG. 4 illustrates a vehicle 402 outfitted with a camera 404 capturing images of two known objects 406 and 456, each object forming an angle relative to the camera according to examples of the disclosed invention. The edges of object 406 can form angle Φ1 with the camera 404. The object 406 can be positioned a distance X1 from the camera 404, for example. Camera 404 can also have known object 456 in its field of view. This object 456 can be positioned a distance X2 from the camera 404, for example. The outer edges of the object 456 and the camera 404 can form an angle Φ2, for example. According to examples of the discloses invention, an increased distance X1 from the camera 404 can correspond to a narrower angle Φ1 as compared to a shorter distance X2 which can correspond to a wider angle Φ2. These angles Φ1 and Φ2 can correspond to the relative width of the object compared to the width of the captured image.

Therefore, according to the above, a computer (not shown) that can have the size of the known object stored thereon (or access to such information from a remote storage facility) can determine the distance between a camera and a known object based on a calculation involving the known object's size and the known object's apparent size in a captured image, for example. In some examples, the computer can determine the known object's associated viewing angle using the apparent size of the known object in the captured image and by knowing the camera's maximum viewing angle and the proportion of the image width the object occupies. Determining the known object's associated viewing angle and one side of a triangle formed between the camera and the known object can define a solution set for the position of the camera using the law of sines or other formulas, for example. In some examples of the disclosed invention, other methods of using an image of a known object to determine a camera's distance from the object are possible. Some examples of the disclosed invention may include other types of calculations or look up tables (LUTs) that can be used by a computer (not shown) to determine a camera's position from a known object. For example, a LUT can be populated with captured image size-to-distance conversions that the computer on the vehicle can utilize to determine the distance of the vehicle from the known object.

In addition to distance in one dimension, other aspects of a vehicle's location with respect to an object can be determined using a vehicle's on-board camera (e.g., the vehicle's offset from the object, the vehicle's orientation with respect to the object, etc.). For example, some examples of the disclosed invention can relate to determining vehicle lateral offset from a known object's position. FIGS. 5A-5D illustrate a vehicle 502 outfitted with a camera 504 capturing an image of a known object 506, and determining the vehicle's lateral offset from the known object according to examples of the disclosed invention. More particularly, FIG. 5A illustrates the vehicle 502 outfitted with the camera 504. The vehicle 502 can be horizontally offset from the center of the known object 506 by a distance of Y1. In comparison, FIG. 5C illustrates the vehicle 502 having an offset Y2 of substantially zero from the center of the known object 506.

The on-board camera 504 on vehicle 502 shown in FIG. 5A can capture the example image 532 shown in FIG. 5B. In this example image 532, the center of object 506 can appear to be at a position P1 away from one edge 534 of the image 532. This position in the example image 532 can correspond to the offset Y1 of the vehicle 502 from the known object 506 in FIG. 5A. On the other hand, the on-board camera 504 on vehicle 502 shown in FIG. 5C can capture the example image 582 shown in FIG. 5D. In this example image 582, the center of object 506 can appear to be positioned at a distance P2 from one edge 584 of the image 582. This position can correspond to the offset Y2 of the vehicle 502 from the known object 506 in FIG. 5C.

As described above, the offset Y2 can be smaller than the offset Y1, which can correspond to the known object 506 in FIG. 5D appearing further from the edge 584 of the image 582 than the known object 506 in FIG. 5B appears from edge 534 of image 532. As such, the offset (e.g., horizontal offset) of the object in the captured image from a reference point in the image (e.g., an edge of the image, a center of the image, etc.) can correspond to the offset of the vehicle from the object.

The vehicle according to examples of the disclosed invention can include an on-board computer (not shown) with information stored thereon (or accessible via remote storage facilities) about the relative position of the camera on the vehicle (e.g., with respect to the center of the vehicle or any other point on the vehicle). This information, in combination with the offset of the known object in the captured image, can be used to determine an offset between the vehicle and the center, of the known object. For example, the computer may determine the offset by using the known object's size to determine a scalar constant associated with how image size on the camera relates to distance in the real world. The computer can also determine an "image offset" indicative of how far the known object is from the center of the image or the edge of the image or any other reference point in the image. The scalar constant can be applied to the image offset to determine the vehicle's offset from the known object. In some examples of the disclosed invention, the computer may determine an absolute offset. In some examples, the computer may determine only a relative offset from the object, which can inform the direction in which the vehicle needs to move to be centered with (or otherwise not offset from) the object, and can use feedback to move the vehicle until the offset is substantially zero.

In accordance with certain examples of the invention, in addition to distance and offset, the height of a vehicle can be determined. More particularly, the height of a known object can be used, in combination with a captured image of the known object, to determine the height of the vehicle from the ground. Although the size of the vehicle's body can be known to an on-board computer, the height of the vehicle can vary depending on a variety of factors, such as cargo weight, for example. Other factors, including, for example, tire pressure, wear and tear to the vehicle's suspension, and replacement of the vehicle's tires with tires of a different size can change the vehicle's height off the ground. Other factors impacting vehicle height are also possible.

FIGS. 6A-6D illustrate a vehicle 602 outfitted with a camera 606 capturing an image of a known object 604, and determining the vehicle's height from the ground. More particularly, FIG. 6A depicts the vehicle 602 with camera 606 having a height Z1 from the ground. Camera 606 can capture an image of a known object 604. As an example, FIG. 6B shows an image 632 that can be captured by camera 606. In this image 632, the center of object 604 can appear to be a distance A1 from the top 636 of the image 632. Likewise, FIG. 6C depicts a vehicle 652 with camera 656 having a height Z2 from the ground. Camera 656 can capture an image of a known object 654. As an example, FIG. 6D shows an image 682 that can be captured by camera 656. In this image 682, the center of object 654 can appear to be a distance A2 from the top 686 of the image 682.

The vehicle 652 in FIG. 6C, though maybe the same vehicle as vehicle 602 in FIG. 6A, can carry more cargo 662 and passengers 664 than vehicle 602, and therefore can have a greater weight than vehicle 602. This greater weight can cause the suspension and/or tires in vehicle 652 to compress more than that of vehicle 602. Accordingly, height Z2 can be shorter than height Z1. Referring again to FIG. 6C, known object 654 can be situated at a distance D from the ground, for example. This distance D can be known by an on-board computer (not shown) incorporated into vehicle 652, for example. In FIG. 6A, known object 604 can also be situated a same distance D from the ground, which can also be known by an on-board computer (not shown) incorporated into vehicle 602, for example.

Because the known object's height from the ground can be known to the on-board computer, the vertical position of the object in a captured image can be used to determine the vehicle's height relative to the ground. Specifically, distance A2 in the image 682 shown in FIG. 6D can be less than the distance A1 in the image 632 shown in FIG. 6B. These distances can correspond to vehicle height, and be used to determine a vertical offset of the vehicle according to examples of the disclosed invention. Vehicle height can be determined in a method similar to the method used to determine vehicle lateral offset, described above. For example, the size of a known object in an image can be used to determine a scalar factor associated with converting size in an image captured by the camera to distance in the real world. The computer can determine an "image offset" associated with the distance the known object appears from the center of the captured image or the edge of the captured image or any other reference point in the captured image. The scalar factor can be used with the image offset to determine the vehicle's height, in some examples. Some examples of the disclosed invention relate to determining a vehicle's absolute height. Some examples of the disclosed invention relate to determining a relative height of the vehicle based on whether the vehicle is lower or higher than a desired height, and can use feedback to adjust the vehicle's height (e.g., via the vehicle's suspension) until the height approaches the desired value. Some examples of the disclosed invention relate to a vehicle capable of adjusting its air suspension, for example, to adjust the vehicle's height to a target value. Additionally or alternatively, some examples include a vehicle charging station featuring the known object. A vehicle may be able to communicate with the charging station and cause the charging station to adjust (e.g., adjust its height) to accommodate the height of the vehicle, for example. Examples of communication methods between the vehicle and the charging station can include wireless communication such as Bluetooth, Wi-Fi, or radio-based communication or wired communication.

Figure 7C:
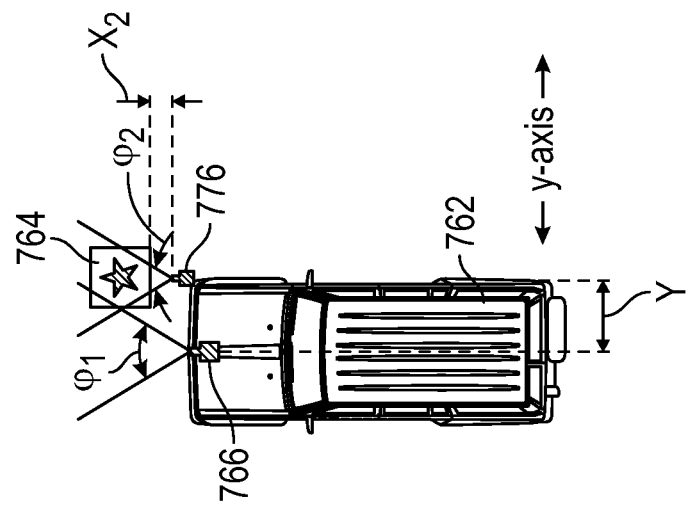
FIGS. 7A-7C illustrates vehicles outfitted with one or more cameras and their associated fields of view parallel to the ground according to examples of the disclosed invention.
Figure 7B:
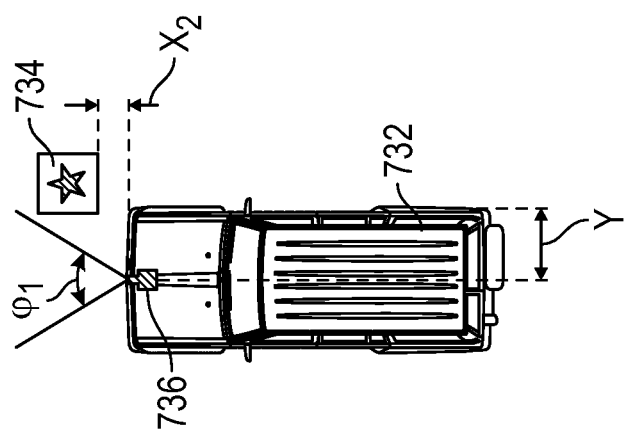
Figure 7A:
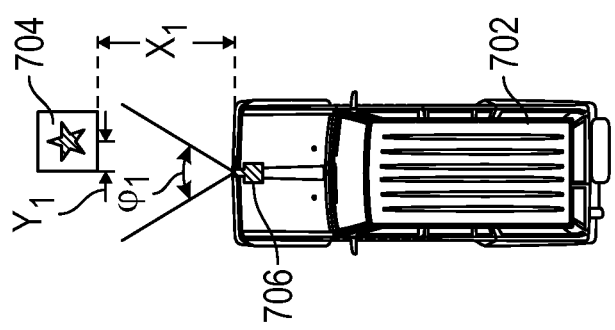

Although some examples of the disclosed invention relate to a vehicle having a single on-board camera, in some examples, the vehicle may have more than one on-board camera, for example. FIGS. 7A-7C illustrates vehicles outfitted with one or more cameras and their associated fields of view parallel to the ground according to examples of the disclosed invention. In FIG. 7A, a vehicle 702 can have a single camera 706 positioned to capture an image of a known object 704. The camera 704 can have a field of view of angle $\Phi 1$ and can be positioned a distance X1 from a known object 704. In this example, the known object 704 can be in the camera's field of view. If, however, the driver positions a vehicle 732 at a smaller distance X2 from a known object 734 (e.g., if the driver drives closer to object 734 while remaining offset from object 734), as shown in FIG. 7B, a single camera 736 may not capture the known object 734 in its field of view of angle $\Phi 1$. In some examples, two or more cameras can be situated at different distances from the center of the vehicle along the y-axis to expand the effective field of view of the camera system on the vehicle. FIG. 7C, for example, shows a vehicle 762 that can have a first camera 766 and a second camera 776, offset (e.g., horizontally) from the first camera 766, situated to capture an image of a known object 764. Although the known object 764 may not be captured by the first camera 766 having a field of view of angle $\Phi 1$, the known object 764 can be captured by the second camera 776 having a field of view of angle $\Phi 2$, for example. Object identification and/or tracking, as discussed in this disclosure, can initially be performed using camera 766, but can transition to camera 776 if object 764 is no longer in the field of view of camera 766. As such, the camera system in FIG. 7C can avoid "blind spots" that may exist in the camera systems in FIGS. 7A-7B.

Figure 8A:
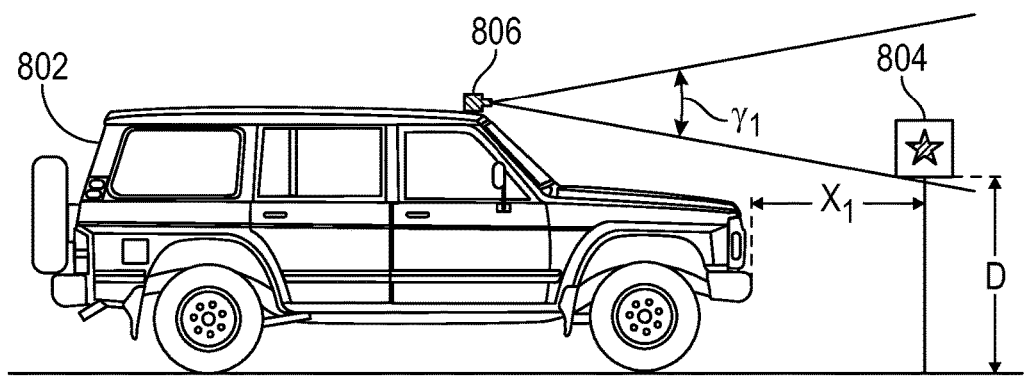
FIGS. 8A-8C illustrate vehicles outfitted with one or more cameras and their associated vertical fields of view according to examples of the disclosed invention.
Figure 8B:
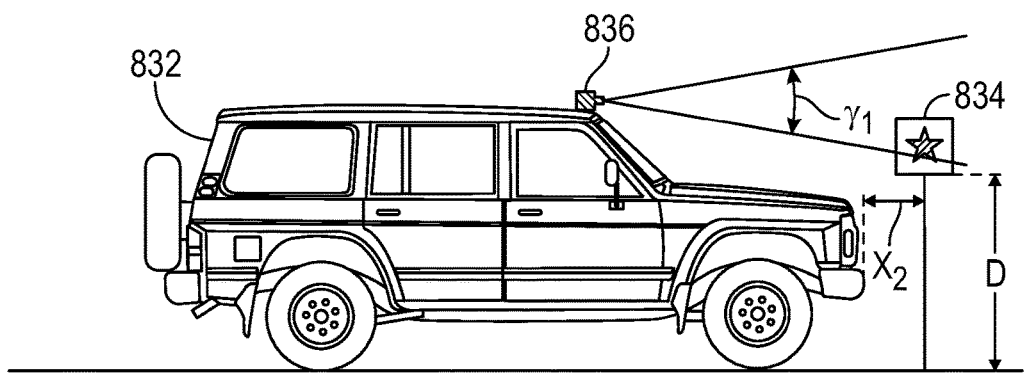
Figure 8C:
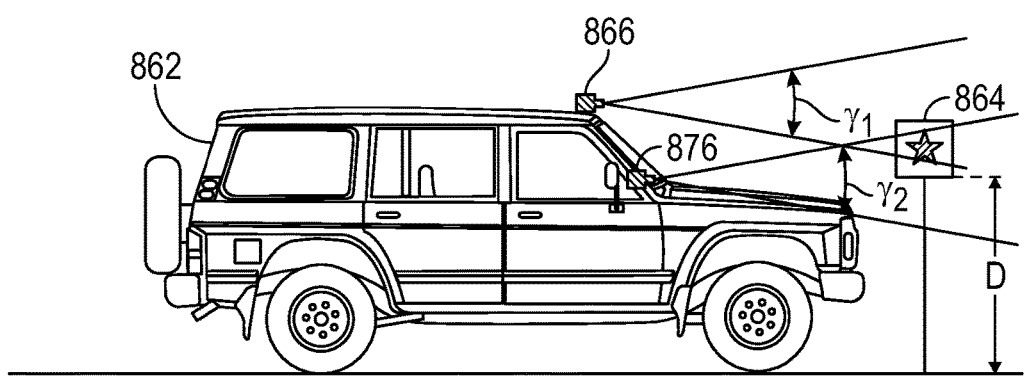

Similarly, some examples of the disclosed invention relate to a vehicle having two or more cameras at different heights from the ground (e.g., vertically offset from each other). FIGS. 8A-8C illustrate vehicles outfitted with one or more cameras and their associated vertical fields of view according to examples of the disclosed invention. In FIG. 8A, a single camera 806 attached to a vehicle 802 at a distance X1 from a known object can capture an image of a known object 804 within a vertical field of view of angle $\gamma 1$. If, as shown in FIG. 8B for example, the driver positions a vehicle 832 at a closer distance of X2 from a known object 834 (e.g., if the driver drives closer to object 834), the camera 836 with a vertical field of view of angle $\gamma 1$ may not capture a full view of the known object 834. According to some examples, one or more additional cameras can be added to the vehicle to provide a larger field of view. For example, FIG. 8C depicts a vehicle 862 having a first camera 866 and a second camera 876, vertically offset from the first camera 866. A known object 864 can be captured by the second camera 876 when the vehicle 862 is a distance X2 from the object 864. This second camera 876 can have a vertical field of view of angle $\gamma 2$, which can encompass the known object 864 to capture an image. Object identification and/or tracking, as discussed in this disclosure, can initially be performed using camera 866, but can transition to camera 876 if object 864 is no longer in the field of view of camera 866. As such, the camera system in FIG. 8C can avoid "blind spots" that may exist in the camera systems in FIGS. 8A-8B.

Examples of the disclosed invention featuring multiple cameras are not limited to the cameras being positioned at different heights or different distances from the center of the vehicle along the y-axis, as shown in FIGS. 7C and 8C. Additionally or alternatively, a vehicle according to examples of the disclosed invention may include one or more cameras at different distances from the front of the vehicle. Additionally or alternatively, a vehicle according to examples of the disclosed invention may include one or more cameras facing different directions to provide expanded camera field of view. Other arrangements of multiple cameras may be possible and may prove advantageous in some examples of the disclosed invention.

Although some examples of the disclosed invention depict the known object as being symmetrical, other examples may include a known object having visual asymmetry. Such asymmetry may facilitate detection of the angle at which a vehicle may be facing the known object. FIGS. 9A-9B illustrate a vehicle 902 outfitted with a camera 906 capturing an image of a known object 904 having an asymmetrical pattern according to examples of the disclosed invention. More particularly, FIG. 9A shows a vehicle 902 that can face a known object 904 at an angle θ with respect to the normal of known object 904, for example. The known object 904 can be visually asymmetrical by including a pattern featuring more than one color. In the example of FIG. 9A, the known object 904 can be horizontally asymmetrical, in that the left side of the known object can be composed of one color (e.g., black), and the right side of the known object can be composed of another color (e.g., white). The vehicle 902 can be outfitted with an on-board camera 906. The camera 906 can capture an image 952 of the known object 904 as shown in FIG. 9B, for example. In the example image 952, because the vehicle/camera can be facing the known object 904 at an angle from the left, the left side of the known object 904 can have height K1 and can appear larger than the right side, which can have height K2, less than K1. In other words, a first portion of the known object's 904 asymmetrical pattern (e.g., the left side of the object) can have a different height than a second portion of the known object's asymmetrical pattern (e.g., the right side of the object). The example vehicle 902 can include an on-board computer (not shown) capable of detecting the different portions of the known object's 904 asymmetrical pattern, and determining the height difference to determine offset angle θ, for example. It is understood that while height is referenced in the discussion above, other characteristics of size (e.g., area, perimeter, etc.) can be used to differentiate the sizes of the different portions of the known object's 904 asymmetrical pattern. Similar to how the on-board computer can be capable of determining the distance between the known object and the camera (as described previously), the computer can determine the distance between each portion of the known object and the camera. For example, the computer can use the process(es) described above to determine the camera's distance from each side of the object, and can use the difference in distance to determine offset angle θ. In some examples of the disclosed invention, absolute offset angle θ may be determined. In some examples of the disclosed invention, the computer can determine a relative offset angle θ, which can inform the direction in which the vehicle should rotate to eliminate its offset angle, and can use a feedback controller to move the vehicle until the offset is corrected.

In some examples, the known object may feature two or more distinct patterns or images. For example, FIGS. 10A-10B illustrate a vehicle 1002 outfitted with a camera 1006 and an image of a known object 1004 having two markings according to examples of the present invention. More particularly, FIG. 10A shows an example vehicle 1002 that can be positioned proximate to a known object 1004. The known object 1004 can feature two distinct markings of different colors (e.g., white and black). The vehicle 1002 can be positioned at an offset angle θ with respect to the normal of object 1004, and can feature an on-board camera 1006. The camera 1006 can capture an image 1052 of the known object 1004 shown in FIG. 10B. The image 1052 can depict both markings of the known object 1004, where the marking on the left can appear to have height K1 while the marking on the right can appear to have height K2, less than K1. The difference between heights K1 and K2 can correspond to the offset angle θ of vehicle 1002. The vehicle 1002 can include an on-board computer (not shown) capable of detecting this height difference and using it to determine offset angle θ. A computer can use a similar method to the examples above to determine offset angle from the two markings. In some examples, the absolute offset angle is determined. In some examples, the angle of the vehicle can be corrected without being explicitly determined.

Figure 11:
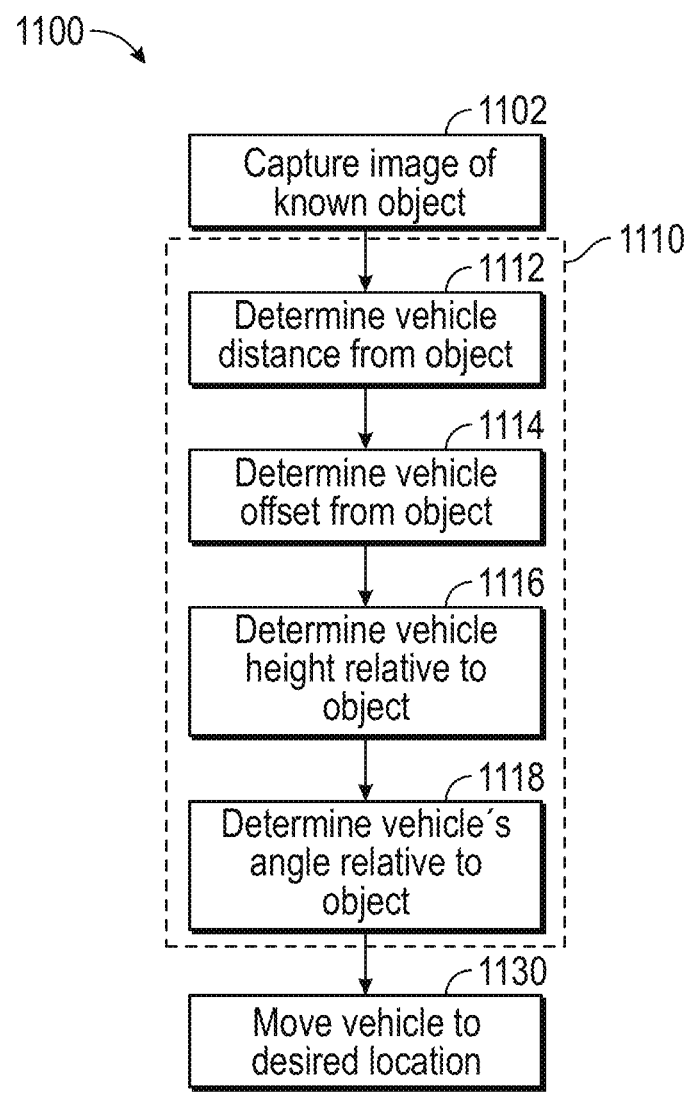
FIG. 11 illustrates a vehicle control process according to examples of the disclosed invention.

As discussed above, the vehicle of the disclosure can determine its location relative to a known object by capturing an image of the known object with a camera. FIG. 11 illustrates a vehicle control process 1100 according to examples of the disclosed invention. During process 1100, a vehicle can use a camera to facilitate automatic driving by determining one or more aspects of the vehicle's position. At step 1102, a camera can capture an image of a known object, as previously described. In situations where the vehicle and the known object are in poor lighting conditions, capturing an image may include shining a light towards the object. This light can be provided by the vehicle's headlights, a camera flash, or any other light incorporated into the vehicle. A light source may provide visual light or infrared light, for example. Additionally or alternatively, some examples of the disclosed invention can feature a known object with a pattern made of a luminescent or reflective material to improve visibility in the dark. In some examples, the known object may emit its own light (e.g., visible or infrared light). The camera can be an appropriate camera for capturing an image of the known object under the above conditions.

Once an image is captured, one or more aspects of the vehicle position can be determined in block 1110. The steps within block 1110 may be performed in any order. One or more steps within block 1110 may not be performed. Other determinations about vehicle position may be made in conjunction with the steps performed in block 1110. In some examples, vehicle distance from the known object can be determined at step 1112, as discussed in this disclosure. In some examples, vehicle offset from the known object can be determined at step 1114, as discussed in this disclosure. In some examples, vehicle height relative to the known object can be determined at step 1116, as discussed in this disclosure. In some examples, vehicle angle relative to the known object can be determined at step 1118, as discussed in this disclosure.

Once vehicle position has been determined in block 1110, the vehicle can be moved automatically in step 1130 using the determined position from block 1110. In some examples, the vehicle can be moved into a desired parking or docking location indicated by the known object. Some examples of the disclosed invention relate to an electric vehicle automatically moving towards a charging station featuring a known marker (the "known object"). Once an electric vehicle is in a desired location relative to the charge station, charging can begin automatically before a driver exits the vehicle.

In some examples, process 1100 can be performed iteratively, continuously, and/or on-demand to move the vehicle to a target location. The target location can be a certain distance and location relative to a recharging station for an electric vehicle, for example. A feedback controller can be used to determine error in a vehicle's position (e.g., angle, offset, distance, height, etc.) relative to the target position and can control the vehicle to move until this error is zero (or another predetermined error amount associated with the vehicle being in the target position). Aspects of the vehicle's position, including distance, offset, angle, and height, can have an error associated therewith. These errors can, for example, be addressed separately in series, or two or more errors can be addressed in parallel. The controller can use any control techniques known to one of ordinary skill in the art including, for example, PID (proportional, integral, and/or derivative) control, so-called "bang-bang" control, or any other technique.

In some examples, error can be determined and the vehicle can subsequently be moved into the target position without determining the vehicle's absolute location relative to the object. Rather, the error can be determined and corrected using feedback. For example, to determine error in a vehicle's position, a comparison can be made between a captured image of a known object and a reference image of the known object associated with a target vehicle position. For example, a reference image of the known object can depict the expected image of the object when the vehicle reaches the target position with respect to the object. This reference image can be stored in an on-board computer incorporated within the vehicle. The reference image can be pre-loaded at the time of vehicle manufacture and/or can be calibrated after manufacture. During operation, the vehicle's computer can compare the baseline image to the image(s) captured by its on-board camera(s) to determine error amounts in the vehicle's angle, offset, distance, height, etc., and can iteratively correct for such errors to move the vehicle to the target location.

In the examples described above, the determination about the vehicle's position with respect to the known object can be made, because the camera's position on the vehicle can be known. Therefore, if the camera's relative position on the vehicle is unknown or compromised (e.g. due to damage), vehicle position may not be determined with accuracy. A calibration procedure can be used when the vehicle's position is known but the camera's position on the vehicle may be unknown. Calibration can take place at a vehicle factory, a vehicle dealership, or by a driver after purchasing the vehicle. For example, a driver can manually position the vehicle at a desired orientation relative to a known object, and can capture an image of the known object with the on-board camera. The image corresponding to that desired position can be stored and used as a reference for the desired position going forward for the automatic maneuvering described in this disclosure.

As described above, in some examples, a camera's position on a vehicle can have known specifications to ensure a precise location for the vehicle can be determined from an image of a known object. If this specification is not possible for cost or other reasons, or if the camera is moved after manufacture (e.g., due to damage or other occurrences), image "flow" can be used to correct for camera offset. Specifically, as a vehicle captures images during movement, some parts of the image can change more over a given interval of time than other parts of the image. The rate of image change in various parts of the captured images can be referred to as the image "flow." A section of an image that changes relatively little over time (e.g., less than a threshold amount) can correspond to the direction of camera travel, for example. Comparing two or more images taken at different points in time from a moving vehicle can provide information about which direction the camera is moving relative to the objects in the images and/or the camera's field of view, as will be described below.

Figure 12A:
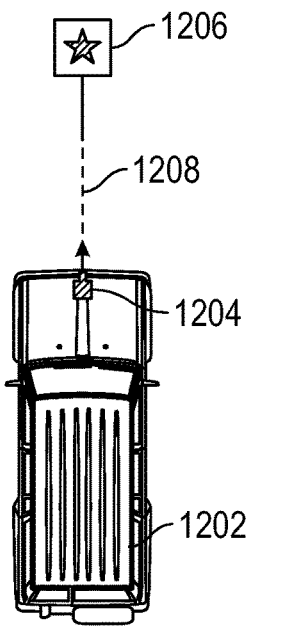
FIGS. 12A-12B illustrate a vehicle outfitted with a camera that determines the vehicle's direction of travel relative to a known object, where the vehicle may be aligned with the object, and the camera may be pointed in the direction of travel of the vehicle according to examples of the disclosed invention.
Figure 12B:
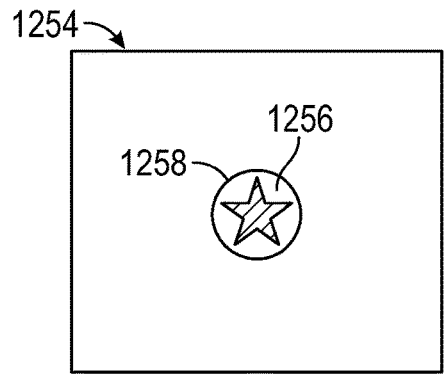

FIGS. 12A-12B illustrate a vehicle 1202 outfitted with a camera 1204 that determines the vehicle's direction of travel relative to a known object 1206, where the vehicle may be aligned with the object, and the camera may be pointed in the direction of travel of the vehicle according to examples of the disclosed invention. FIG. 12A depicts a vehicle 1202 outfitted with a camera 1204 facing a known object 1206, for example. The camera 1204 can capture a series of images as the vehicle 1202 moves towards the object 1206. FIG. 12B shows an example field of view 1254 of camera 1204 according to some examples of the disclosed invention. In FIG. 12A, the vehicle 1202 can be moving towards the object 1206 along a first axis 1208, and the camera 1204 can be pointed towards the object 1206 along the same first axis (i.e., the camera and the vehicle can be aligned). As the camera moves, objects towards which the camera moves can fall within a section 1258 of the field of view 1254 having a minimum flow. This section 1258 of the field of view 1254 can change at a slower rate than the rest of the image, as discussed above. Because known object 1256 can fall within the minimum flow section 1258 of the field of view 1254 in FIG. 12B, it can be determined that the camera may be moving directly towards the known object. Thus, field of view 1254 in FIG. 12B may correspond to camera 1204 on vehicle 1202 approaching object 1206 in FIG. 12A. In other words, when a minimum flow in a camera image aligns with a known object in the image, a determination can be made that the vehicle is traveling towards the object, for example. Relatedly, when the minimum flow is in the center of the image, a determination can be made that the camera is facing the direction of travel.

Figure 13A:
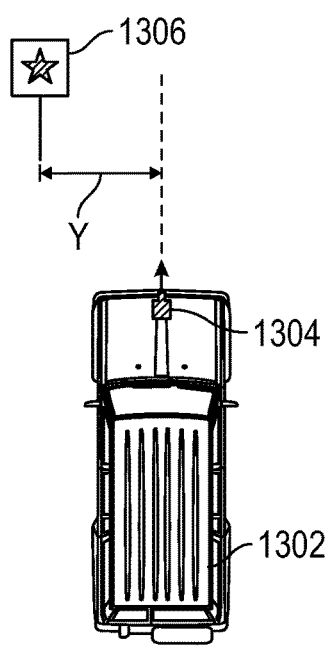
FIGS. 13A-13B illustrate a vehicle outfitted with a camera that determines the vehicle's direction of travel relative to a known object, where the vehicle may not be aligned with the object, and the camera may point in the direction of travel of the vehicle according to examples of the disclosed invention.
Figure 13B:
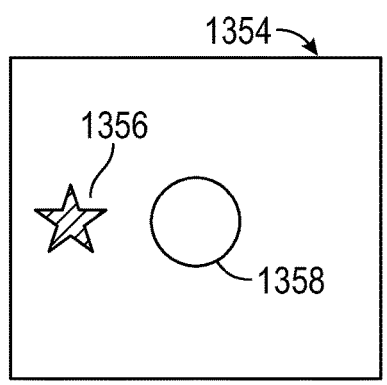

A vehicle may also be positioned offset from the known object, as previously described. FIGS. 13A-13B illustrate a vehicle 1302 outfitted with a camera 1304 that determines the vehicle's direction of travel relative to a known object 1306, where the vehicle may not be aligned with the object, and the camera may point in the direction of travel of the vehicle according to examples of the disclosed invention. FIG. 13A depicts vehicle 1302 outfitted with camera 1304. In this example, vehicle 1302 can be horizontally offset from known object 1306 by some distance Y. FIG. 13B shows a field of view 1354 that can correspond to camera 1304 in FIG. 13A. Field of view 1354 can feature a minimum flow section 1358 and a captured image 1356 of a known object. In this example, the camera 1304 may not be moving directly towards known object 1306. Correspondingly, the minimum flow section 1358 of field of view 1354 may not encompass the image 1356 of the known object. Thus, the distance in the field of view 1354 between the minimum flow section 1358 and the object 1356 can correspond to the horizontal offset of the camera/vehicle with respect to the object 1356. Although illustrated with a horizontal offset, it is understood that vertical offsets between the camera/vehicle and the object can similarly be determined. By determining the location of the minimum flow in a camera image, a determination can be made whether a vehicle is moving towards a known object in the camera image. When the minimum flow does not align with an image of the known object, a determination can be made that the camera is not aligned with the object. A calculation similar to the example offset calculations described above can be used to determine offset using the distance between the image of the known object and the minimum flow in the camera image. In some examples, offset can be corrected using a feedback controller with or without determining absolute offset.

Figures 14A, 14B:
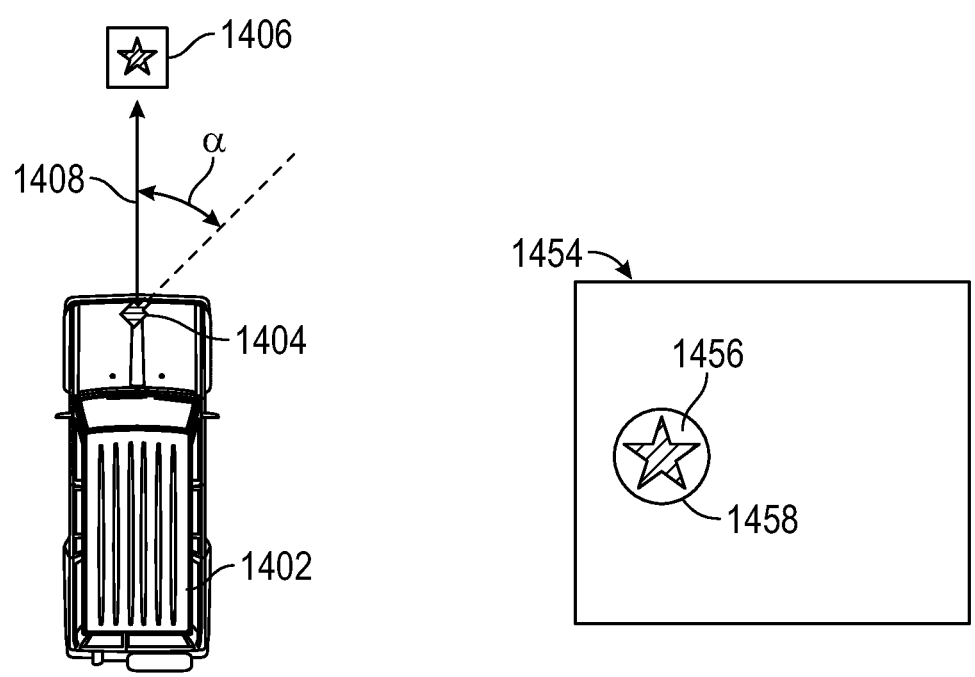
FIGS. 14A-14B illustrate a vehicle outfitted with a camera that determines the vehicle's direction of travel relative to a known object, where the vehicle may be aligned with the object, and the camera may not be pointed in the direction of travel of the vehicle according to examples of the disclosed invention.

In some examples, a vehicle may be moving towards a known object, but the camera can be offset from the vehicle's direction of motion by some angle. If this angle is different from the angle at time of manufacture, a flow determination can determine the offset angle, which can be used in subsequent vehicle position/orientation determinations. FIGS. 14A-14B illustrate a vehicle 1402 outfitted with a camera 1404 that determines the vehicle's direction of travel relative to a known object 1406, where the vehicle may be aligned with the object, and the camera may not be pointed in the direction of travel of the vehicle according to examples of the disclosed invention. For example, FIG. 14A depicts a vehicle 1402 outfitted with a camera 1404 offset from a line of motion 1408 of vehicle 1402 by angle α. FIG. 14B shows an example field of view 1454 that can correspond to a field of view of camera 1404 as vehicle 1402 moves towards known object 1406. In this example, camera 1404 may move towards known object 1406, but may not face it. Accordingly, in example field of view 1454, a minimum flow section 1456 can be offset from the center of the field of view 1454. Because vehicle 1402 may move towards known object 1406, a captured image 1456 of known object 1406 may fall within minimum flow section 1458. Accordingly, a calculation can be performed based on the minimum flow section of the camera's field of view to determine the angle between the vehicle's motion and the camera's view direction (e.g., the angle can be proportional to the degree to which the minimum flow section is offset from the center of the camera's field of view). When the minimum flow corresponds with a known object, it can be determined that the camera is heading towards the object, even if it may not be facing it directly, for example.

Figure 15:
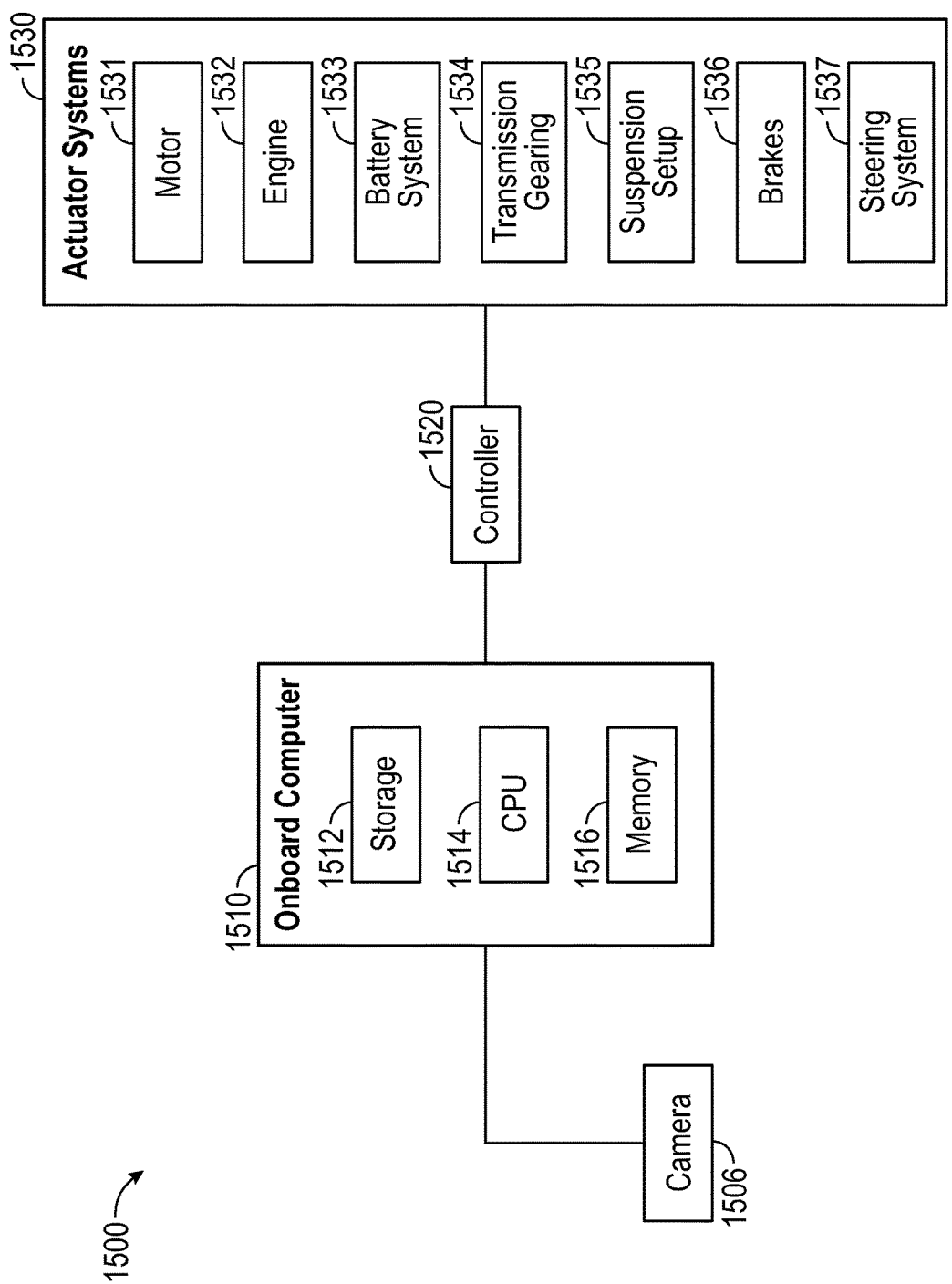
FIG. 15 illustrates a system block diagram according to examples of the disclosed invention.

FIG. 15 illustrates a system block diagram according to examples of the disclosed invention. Vehicle control system 1500 can perform any of the methods described with reference to FIGS. 1-14. System 1500 can be incorporated into a vehicle, such as a consumer automobile for example. Other example vehicles that may incorporate the system 1500 include, without limitation, airplanes, boats, or industrial automobiles. Vehicle control system 1500 can include a camera 1506 capable of capturing an image. Vehicle control system 1500 can include an on-board computer 1510 coupled to the camera 1506, and capable of receiving an image from the camera and determining one or more aspects of the vehicle's position relative to a known object in the image. On-board computer 1510 can include storage 1512, memory 1516, and a processor 1514. Processor 1514 can perform any of the methods described with reference to FIGS. 1-14. Additionally, storage 1512 and/or memory 1516 can store data and instructions for performing any of the methods described with reference to FIGS. 1-14. Storage 1512 and/or memory 1516 can be any non-transitory computer readable storage medium, such as a solid-state drive or a hard disk drive, among other possibilities. The vehicle control system 1500 can also include a controller 1520 capable of moving the vehicle automatically based on the determinations of the on-board computer 1510.

In some examples, the vehicle control system 1500 can be connected (e.g., via controller 1520) to one or more actuator systems 1530 in the vehicle. The one or more actuator systems 1530 can include, but are not limited to, a motor 1531 or engine 1532, battery system 1533, transmission gearing 1534, suspension setup 1535, brakes 1536, and steering system 1537. Based on the determined vehicle position relative to the known object (e.g., charging station), the vehicle control system 1500 can control one or more of these actuator systems 1530 to direct the vehicle to move in an intended direction. This can be done by, for example, adjusting the steering angle and engaging the drivetrain (e.g., motor) to move the vehicle at a controlled speed. The camera system 1506 can continue to capture images and send them to the vehicle control system 1500 for analysis, as detailed in the examples above. The vehicle control system 1500 can, in turn, continuously or periodically send commands to the one or more actuator systems 1530 to control the movement of the vehicle. As the vehicle approaches a predetermined target area (e.g., a charging spot in front of a charging station), the vehicle control system 1500 can control actuator systems 1530, such as the brakes 1536, to stop the vehicle when it is within a certain distance from the charging station. If the vehicle control system 1500 determines, based on the images captured by the camera system 1506, that the height of the vehicle requires adjustments to align a charging port on the vehicle with the charger, the vehicle control system 1500 can further adjust the suspension setup 1535, as detailed previously.

According to the above, some examples of the disclosed invention are directed to a vehicle control system, comprising: a first camera included in a vehicle, the first camera configured to capture one or more images of an object having a first characteristic; a computing system coupled to the first camera, the computing system comprising: memory configured to store the first characteristic of the object, the first characteristic of the object stored on the memory prior to the capture of the one or more images of the object by the first camera; and a processor configured to determine a location of the first camera with respect to the object based on the one or more images captured by the first camera and the first characteristic of the object stored in the memory; and a controller configured to control movement of the vehicle based on the determined location. Additionally or alternatively to one or more of the examples described above, in some examples, the memory is further configured to store a position and an orientation of the first camera with respect to the vehicle; and the processor is further configured to determine a location of the vehicle with respect to the object based on the position and the orientation of the first camera with respect to the vehicle. Additionally or alternatively to one or more of the examples described above, in some examples, the location of the first camera with respect to the object comprises one or more of a distance from the object, a horizontal offset with respect to the object, an angle relative to a normal axis of the object, and a height relative to the object. Additionally or alternatively to one or more of the examples described above, in some examples, the distance from the object is determined at least by a size of the object in the one or more images and the first characteristic of the object. Additionally or alternatively to one or more of the examples described above, in some examples, one or more of horizontal offset with respect to the object and height relative to the object is determined at least by a position of the object within the one or more images and the first characteristic of the object. Additionally or alternatively to one or more of the examples described above, in some examples, the object comprises a first half having a first visual characteristic and a second half having a second visual characteristic, different from the first visual characteristic, and the angle of the first camera relative to the normal axis of the object is determined at least by a comparison between a size of the first half in the one or more images and a size of the second half in the one or more images. Additionally or alternatively to one or more of the examples described above, in some examples, the memory is further configured to store a baseline image corresponding to a target location of the vehicle, and the controller is configured to move the vehicle based at least on the baseline image and the one or more images captured by the first camera. Additionally or alternatively to one or more of the examples described above, in some examples, the vehicle control system comprises a second camera configured to capture one or more images of the object, wherein a combined field of view of the first and second cameras is greater than a field of view of the first camera. Additionally or alternatively to one or more of the examples described above, in some examples, at a first time, the processor is configured to determine a location of the vehicle with respect to the object based on the one or more images captured by the first camera, and at a second time, after the first time, when the object is no longer within the field of view of the first camera, the processor is configured to determine the location of the vehicle with respect to the object based on the one or more images captured by the second camera. Additionally or alternatively to one or more of the examples described above, in some examples, the processor is further configured to determine a difference between a direction of movement of the vehicle and a center of a field of view of the first camera based on a position of minimum flow in the one or more images relative to a location of the object in the one or more images. Additionally or alternatively to one or more of the examples described above, in some examples, determining the location of the first camera with respect to the object comprises determining an orientation of the first camera with respect to the object.

According to the above, some examples of the disclosed invention are directed to a method of controlling a vehicle, comprising: storing a first characteristic of a first object in a memory of a computing system; after storing the first characteristic of the first object in the memory, capturing one or more images of the object having the first characteristic with a first camera included in the vehicle; determining a location of the first camera with respect to the object based on the one or more images captured by the first camera and the first characteristic of the object stored in the memory; and controlling movement of the vehicle based on the determined location.

According to the above, some examples of the disclosed invention are directed to a non-transitory computer readable storage medium having stored thereon a set of instructions for controlling a vehicle, which when executed by a processor, causes the processor to: receive one or more images of an object having a first characteristic, the one or more images captured by a first camera included in the vehicle; determine a location of the first camera with respect to the object based on the one or more images captured by the first camera and the first characteristic of the object stored in memory, the first characteristic of the object having been stored in the memory prior to receiving the one or more images of the object; and control movement of the vehicle based on the determined location.

Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. A vehicle control system, comprising:
a first camera included in a vehicle, the first camera configured to capture one or more images of an object having a first characteristic;
a computing system coupled to the first camera, the computing system comprising:
memory configured to store the first characteristic of the object, the first characteristic of the object stored on the memory prior to the capture of the one or more images of the object by the first camera; and
a processor configured to determine a location of the first camera with respect to the object based on the one or more images captured by the first camera and the first characteristic of the object stored in the memory, wherein the location of the first camera with respect to the object comprises one or more of a distance from the object, a horizontal offset with respect to the object, an angle relative to a normal axis of the object, and a height relative to the object, and wherein the distance from the object is determined at least by a size of the object in the one or more images and the first characteristic of the object; and
a controller configured to control movement of the vehicle based on the determined location.

2. The vehicle control system of claim 1, wherein:
the memory is further configured to store a position and an orientation of the first camera with respect to the vehicle; and
the processor is further configured to determine a location of the vehicle with respect to the object based on the position and the orientation of the first camera with respect to the vehicle.

3. The vehicle control system of claim 1, wherein one or more of horizontal offset with respect to the object and height relative to the object is determined at least by a position of the object within the one or more images and the first characteristic of the object.

4. The vehicle control system of claim 1, wherein:
the object comprises a first half having a first visual characteristic and a second half having a second visual characteristic, different from the first visual characteristic, and
the angle of the first camera relative to the normal axis of the object is determined at least by a comparison between a size of the first half in the one or more images and a size of the second half in the one or more images.

5. The vehicle control system of claim 1, wherein:
the memory is further configured to store a baseline image corresponding to a target location of the vehicle, and
the controller is configured to move the vehicle based at least on the baseline image and the one or more images captured by the first camera.

6. A vehicle control system, comprising:
a first camera included in a vehicle, the first camera configured to capture one or more images of an object having a first characteristic;
a second camera configured to capture one or more images of the object, wherein a combined field of view of the first and second cameras is greater than a field of view of the first camera;
a computing system coupled to the first camera, the computing system comprising:
memory configured to store the first characteristic of the object, the first characteristic of the object stored on the memory prior to the capture of the one or more images of the object by the first camera; and
a processor configured to determine a location of the first camera with respect to the object based on the one or more images captured by the first camera or the one or more images captured by the second camera and based on the first characteristic of the object stored in the memory, wherein at a first time, the processor is configured to determine a location of the vehicle with respect to the object based on the one or more images captured by the first camera, and at a second time, after the first time, when the object is no longer within the field of view of the first camera, the processor is configured to determine the location of the vehicle with respect to the object based on the one or more images captured by the second camera; and a controller configured to control movement of the vehicle based on the determined location.

7. The vehicle control system of claim 1, wherein:

the processor is further configured to determine a difference between a direction of movement of the vehicle and a center of a field of view of the first camera based on a position of minimum flow in the one or more images relative to a location of the object in the one or more images.

8. The vehicle control system of claim 1, wherein determining the location of the first camera with respect to the object comprises determining an orientation of the first camera with respect to the object.

9. A method of controlling a vehicle, comprising:

storing a first characteristic of a first object in a memory of a computing system;

after storing the first characteristic of the first object in the memory, capturing one or more images of the object having the first characteristic with a first camera included in the vehicle;

determining a location of the first camera with respect to the object based on the one or more images captured by the first camera and the first characteristic of the object stored in the memory, wherein the location of the first camera with respect to the object comprises one or more of a distance from the object, a horizontal offset with respect to the object, an angle relative to a normal axis of the object, and a height relative to the object, and wherein one or more of horizontal offset with respect to the object and height relative to the object is determined at least by a position of the object within the one or more images and the first characteristic of the object; and controlling movement of the vehicle based on the determined location.

10. The method of claim 9, further comprising:

storing, in the memory, a position and an orientation of the first camera with respect to the vehicle; and determining a location of the vehicle with respect to the object based on the position and the orientation of the first camera with respect to the vehicle.

11. The method of claim 9, wherein the distance from the object is determined at least by a size of the object in the one or more images and the first characteristic of the object.

12. The method of claim 9, wherein:

the object comprises a first half having a first visual characteristic and a second half having a second visual characteristic, different from the first visual characteristic, and the angle of the first camera relative to the normal axis of the object is determined at least by a comparison between a size of the first half in the one or more images and a size of the second half in the one or more images.

13. The method of claim 9, further comprising:

after storing the first characteristic of the first object in the memory, capturing one or more images of the object having the first characteristic with a second camera included in the vehicle, wherein a combined field of view of the first and second cameras is greater than a field of view of the first camera.

14. The method of claim 13, wherein:

at a first time, the processor is configured to determine a location of the vehicle with respect to the object based on the one or more images captured by the first camera, and at a second time, after the first time, when the object is no longer within the field of view of the first camera, the processor is configured to determine the location of the vehicle with respect to the object based on the one or more images captured by the second camera.

15. The method of claim 9, further comprising:

determining a difference between a direction of movement of the vehicle and a center of a field of view of the first camera based on a position of minimum flow in the one or more images relative to a location of the object in the one or more images.

16. The method of claim 9, wherein determining the location of the first camera with respect to the object comprises determining an orientation of the first camera with respect to the object.

17. The vehicle control system of claim 6, wherein:

the memory is further configured to store a position and an orientation of the first camera with respect to the vehicle; and the processor is further configured to determine a location of the vehicle with respect to the object based on the position and the orientation of the first camera with respect to the vehicle.

18. The vehicle control system of claim 6, wherein the location of the first camera with respect to the object comprises one or more of a distance from the object, a horizontal offset with respect to the object, an angle relative to a normal axis of the object, and a height relative to the object.

19. The vehicle control system of claim 6, wherein:

the processor is further configured to determine a difference between a direction of movement of the vehicle and a center of a field of view of the first camera based on a position of minimum flow in the one or more images relative to a location of the object in the one or more images.

20. The vehicle control system of claim 6, wherein determining the location of the first camera with respect to the object comprises determining an orientation of the first camera with respect to the object.

* * * * *